Patented July 14, 1942

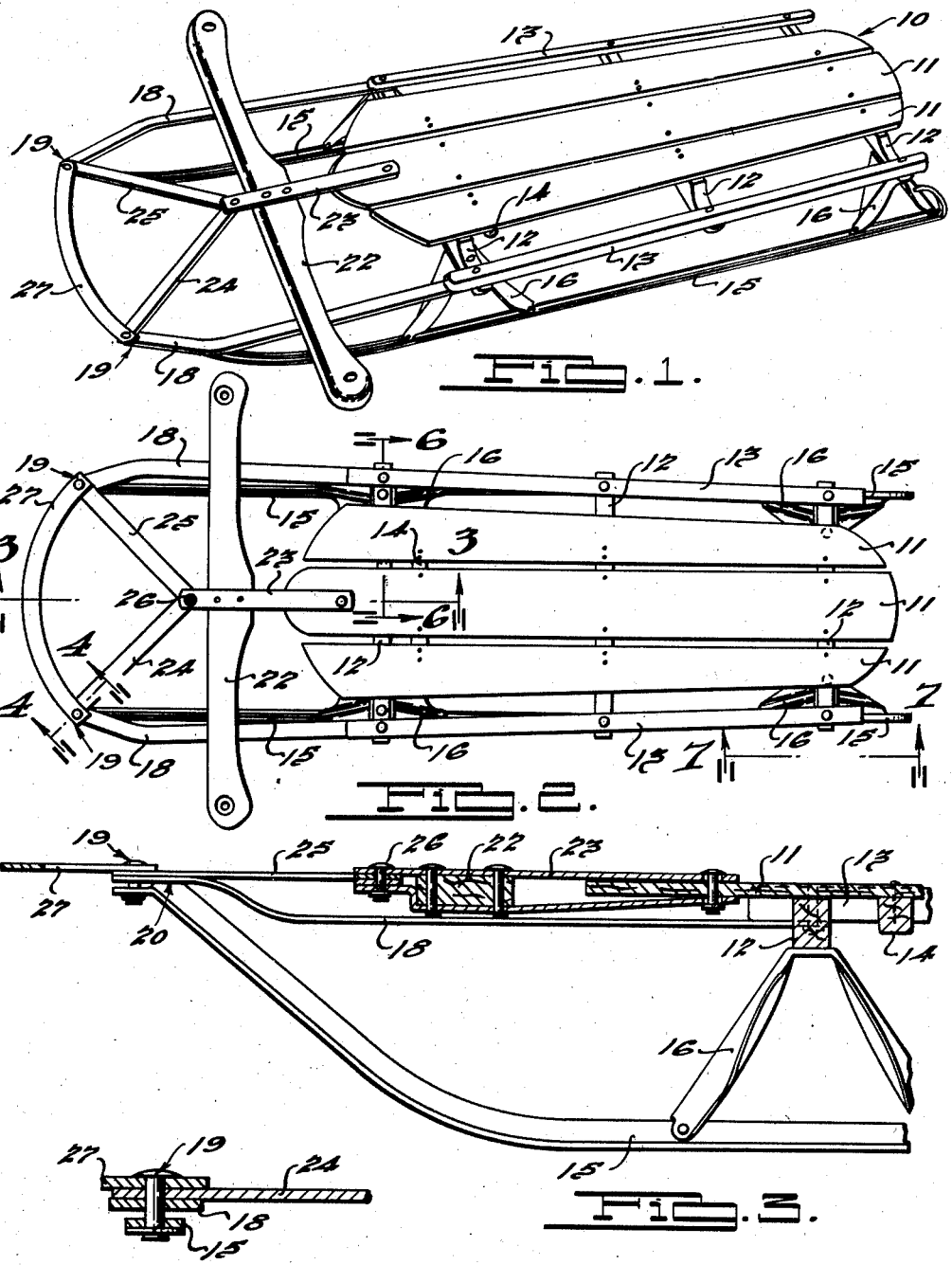

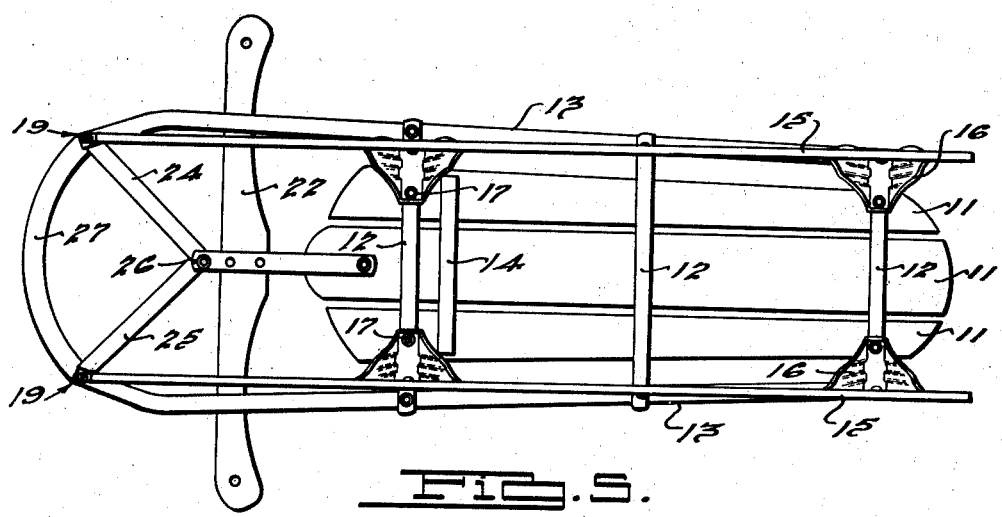
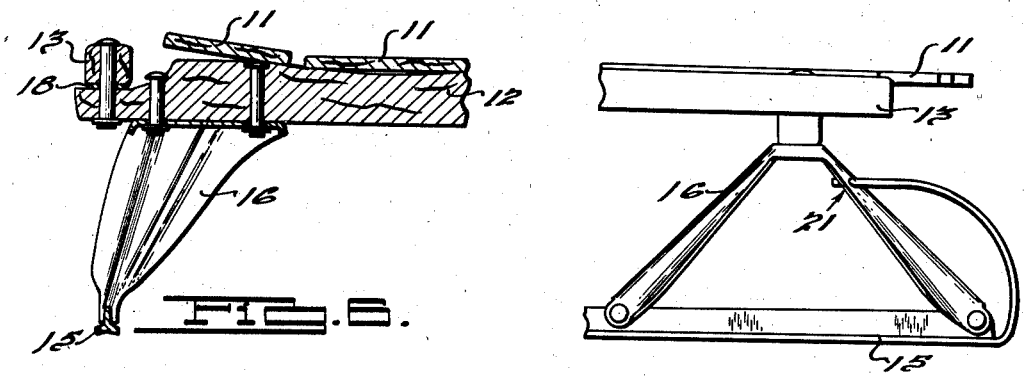
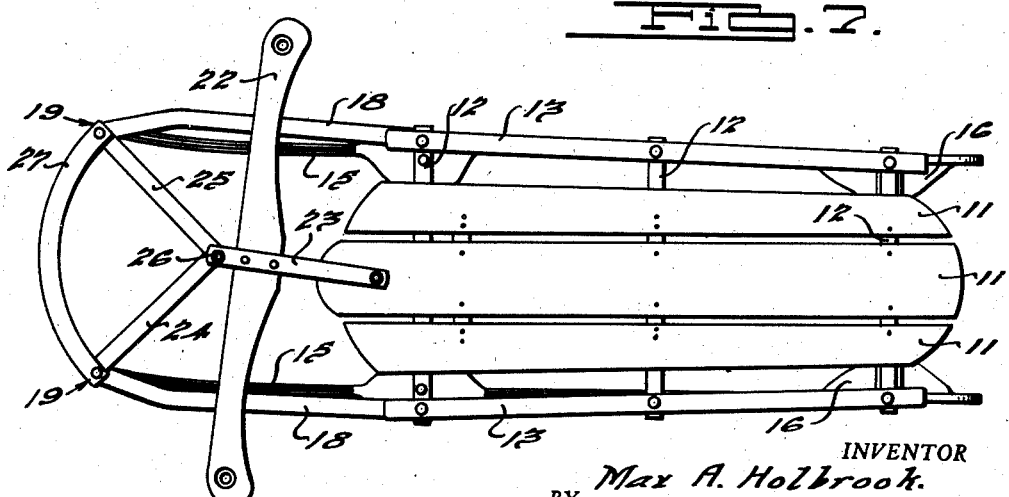

2,289,426

UNITED STATES PATENT OFFICE 2,289,426

COASTING SLED

Max A. Holbrook, Coldwater, Mich.

Application May 21, 1940, Serial No. 336,429

5 Claims. (Cl. 280—22)

The present invention relates to new and useful improvements in safety coasting sleds and relates particularly to sleds of the type which are steered by a lateral bending or flexing of the runners.

It is one object of the invention to provide a safety sled having laterally flexible runners in which the steering qualities are improved and in which the direction of the sled is more easily and quickly changed or controlled with less effort than that required in connection with former sleds of the general type to which my invention relates.

Another object of the invention is to provide a durably constructed coasting sled which is especially safe in use; one which is ornamental in appearance; and one in which provision is made to eliminate or protect portions of the runners which normally form sharp dangerous extensions or ends.

A further object of the invention is to provide a coasting sled of the foregoing general character in which the steering mechanism includes a novel, improved link or lever system controllably connecting the runners with the steering member, the links of said system being pivoted to the steering bar below a line connecting the respective points of juncture of the links and runners. Such a steering mechanism provides an efficient and improved transfer of force to the runners on a turning of the steering bar; provides a desirable lateral thrust to the runners; flexes or bends both runners to substantially the same extent thereby ensuring improved tracking of the sled when it is steered; and provides an effective and easily controlled steering mechanism. Moreover, the steering mechanism of the present invention includes a bar which connects the forward ends of the runners and which not only forms a part of the steering mechanism additional to the aforesaid links or levers, but also acts as a protecting bumper.

Other objects and advantages of this invention will appear in the following description and appended claims, reference being had to the accompanying drawings forming a part of this specification wherein like reference characters designate corresponding parts in the several views.

Fig. 1 is a view in perspective of a sled embodying a preferred form of the present invention.

Fig. 2 is a top plan view of the sled construction shown in Fig. 1.

Fig. 3 is a fragmentary longitudinal section taken substantially along the line 3—3 of Fig. 2 in the direction of the arrows.

Fig. 4 is an enlarged detail view in section taken substantially along the line 4—4 of Fig. 2 in the direction of the arrows showing, in particular, one pivotal connection in the link or lever system utilized in the present invention.

Fig. 5 is a bottom plan view of the sled construction shown in Fig. 1.

Fig. 6 is a fragmentary cross section taken substantially along the line 6—6 of Fig. 2 in the direction of the arrows.

Fig. 7 is a fragmentary side elevation taken substantially along the line 7—7 of Fig. 2 in the direction of the arrows and shows, in particular, a form of safety runner which may be utilized in connection with a sled embodying the present invention.

In Figs. 1 to 7 inclusive the parts of the sled are shown in position to direct the sled in a substantially linear direction and the runners are in their normal or unflexed position.

Fig. 8 is a view similar to Fig. 2, but shows the parts of the sled construction in position for directing the sled to the right of the linear direction, and the runners are bent or flexed in a substantially parallel manner to the right.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed hereby beyond the requirements of the prior art.

In one preferred embodiment of my invention shown here by way of example, the sled body may comprise a top member or deck generally designated by the reference numeral 10. This top member may be formed of any suitable material and may be of any desired operable construction. One satisfactory structure constitutes a plurality of longitudinally extending strips or slats 11, 11. These strips are held together by transversely extending benches or bolsters 12 to which they are secured and which are disposed at various points where required. These benches or bolsters are preferably of sufficient length to extend beyond the side edges of the top member 10 to form supports for the side rails or sills 13, 13 which extend parallel to the longitudinal slats 11, 11 and are rigidly secured to the bolsters. If desired, additional supports or cleats as shown at 14 (Fig. 5) may be utilized to form a durable top member and to further tie the slats 11, 11 together. Preferably these cleats do not extend to the side rails 13.

The reference numerals 15, 15 represent a plurality of laterally flexible metallic runners. Preferably these runners are laterally spaced and a pair of them is used. For holding the top member 10 in properly spaced relation over the runners and for connecting the parts of the sled together, suitable supports or knees 16, 16 are provided. While these supports may be of any desired construction, I prefer to use supports formed from sheet metal. These supports or knees preferably are generally V-shaped having downwardly diverging legs and a somewhat flattened top portion which forms a suitable seat for the benches or bolsters 12 of the top member 10 which is secured to the supports. The diverging legs of the knees 16 are rigidly fixed to the runners by riveting or other suitable means. Preferably one pair of these supports is disposed beneath a rear bench or bolster and is secured thereto as by riveting, while another pair of supports may be similarly secured to a forward bolster or bench, as shown in the drawings.

It is desirable, however, that the knees or supports 16 be capable of movement relative to the bench or bolster 12 to which they are secured. I prefer to arrange for this movement by providing the relatively flat top portions of the knees with slots as shown at 17, 17 (Fig. 5). One of the rivets or bolts by which each of the said supports is secured to the bolster may pass through this slot and permit the support to freely turn through a limited arc with respect to the top member 10 and thereby aid in the lateral flexing of the runners as more fully pointed out hereinafter.

The runners 15, 15 are bent generally upwardly and forwardly at their forward ends in the manner best shown in Fig. 3 and are attached to the side bars 18, 18. This connection may be a pivotal connection. For example, each side bar 18 and the forward end of one of the runners 15 may be held together by the pivot 19 (Fig. 4). However, the runner and side bar 18 may be rigidly secured together as by spot welding as shown at 20 (Fig. 3). Preferably the rear ends of the side bars 18, 18 are disposed beneath the adjacent ends of the forward bolster 12 and the forward end of one of the side rails or sills 13, 13 as indicated in Figs. 1, 5 and 8. It is desirable that this connection be a pivotal one so that each side bar 18 may move relative to the side sills and bolster and, therefore, move relative to the top member 10 in order to aid in a lateral flexing of the runners 15, 15.

One construction of the rear section of the runners is shown, in particular, in Fig. 7. As there shown, the rear ends of the runners 15 are arcuately bent generally upwardly and forwardly and are connected to one leg of the rear knee or support 16. The terminus of the runner 15 may be secured to this knee by any suitable means. For example, it may be retained in a slot, shown at 21 (Fig. 7), and, consequently, to the knee 16. This structure of the rear runners eliminates the usual sharp terminal extensions of the runners and provides a practical and effective means of protecting the user of the sled from injury due to such sharp ends. Moreover, I have found that the speed of the sled is increased if the runners are bent in accordance with the present invention inasmuch as the extending rear ends of the runners do not drag and, consequently, hamper the sliding movement of the sled.

More particular reference will now be made to the mechanism directly concerned with the steering of the sled. This mechanism includes a cross handle bar 22 disposed in advance of the forward end of the center slat of the top member 10. This handle bar is of sufficient length to laterally project beyond the runners on either side of the sled and is positioned to enable the operator to actuate it in order to steer the sled. The handle bar 22 is rigidly fixed to a steering bar 23 as by rivets or the like. This steering bar 23 normally extends parallel to and coincident with the center line of the sled and, while it may be of any preferred construction, it is desirably formed of two vertically spaced strips of flat metal respectively disposed above and below the handle bar in the manner clearly shown in Fig. 3. At its rear end, the steering bar 23 is pivoted to the forward end of the top member 10 preferably to the center slat thereof as shown in the drawings. The handle bar 22 and steering bar 23 comprise a steering member which extends forwardly from the top member 10. However, it will be noted that the runners 15, 15 and side bars 18, 18 project forwardly beyond this steering member 22, 23.

To the forward end of the steering bar 23, that is, the end oppositely disposed to the pivotal connection to the top member 10, a plurality of links 24, 25 are connected. While two of these links are shown in the drawings it is to be understood that more than two may be employed. Each of these links extends inwardly from the forward end of one of the runners 15, 15 and is pivotally connected thereto. Each of these links is also pivotally connected to the steering bar 23. These links 24 and 25 may be pivoted to the runners 15 by means of the pivot 19 which also pivotally connects each of the side bars 18, 18 to the runners, or a separate pivot may be employed. Also the links 24, 25 may be pivoted to the steering bar 23 by a common pivot, as shown at 26, or they may be separately pivoted thereto.

The forward ends of the runners 15, 15 are interconnected by a cross piece or bumper 27. This cross piece 27 is pivotally connected to the forward ends of the runners 15 and may be connected thereto by the pivot 19 as indicated in Fig. 4. It will, therefore, be understood that the pivot 19 may serve as a common pivot for connecting the cross piece 27 to the runners 15 and also for connecting the links 24, 25 as well as side bars 18 thereto. The cross piece 27 is preferably arcuate in shape but may be of any desired shape and construction.

The steering of a sled embodying the present invention is controlled by actuation of the handle bar 22. This handle bar may be pushed or pulled by the operator of the sled to the right or to the left to turn the steering bar 23 about its pivotal connection to the top member 10. When the steering bar is turned to the right the runners are flexed to the right and the sled is turned in that direction, and when the steering bar is turned to the left the sled is directed to the left. The position of the parts for directing the sled to the right is shown in Fig. 8. As there shown, the turning movement of the steering bar 23 is transmitted to the link 25 which produces a lateral thrust on the right runner 15. At the same time the link 24 is pulled and will pull the left runner 15 to the right. It will be seen that movement of the links 24 and 25 also moves the cross piece 27 which ensures a substantially parallel flexing of the runners.

The steering bar 23 is a lever pivoted about one end and moved by forces applied intermediate its ends. This type of lever does not transmit forces efficiently unless the forces are transmitted from a point relatively near the pivotal point and preferably near the point where the forces are applied. It will be noted that, according to the present invention, the links 24 and 25 are force transmitting links and are connected to the steering bar 23 at a point adjacent the handle bar 22 and, therefore, at a point near the application of force to the steering bar. Consequently, forces are efficiently transmitted to the runners and much less effort is required to steer a sled made in accordance with the present invention.

It should also be expressly noted that the steering bar 23 of the present invention is much shorter than steering bars in sleds of the general type to which the present invention relates. In fact, the steering bar of the present invention terminates considerably below a line connecting the forward ends of the runners. The connecting links 24 and 25 are, of course, pivoted to the steering bar at a point below such a line. This arrangement is much more efficient than structures employing a relatively long steering bar, in particular a steering bar terminating in advance of a line connecting the forward ends of the runners. Relatively long steering bars of the latter type are pivoted to the top member at their lower end and the handle bar to which the turning force is applied is located relatively near this pivot. However, a force is transmitted to the runners from the distant forward end of the steering bar. Consequently, in such structures the forces are not transmitted to a connecting link leading to the runners at a point near the application of the force to the steering bar, as in the present invention and are, in addition, transmitted from a point far removed from the pivot of the steering bar. In the present invention the steering bar is short and the forces are thus transmitted therefrom from a point relatively near the pivot of the steering bar. For these reasons prior structures have not produced the satisfactory and efficient transmission of forces accomplished by the present invention.

Another feature of the present construction is that each of the links 24 and 25 are pivoted at their outer ends on substantially the same plane laterally inasmuch as the runners 15, 15 are of substantially the same length. Since these levers are preferably pivoted at their inner ends at the same point on the steering bar 23, it will be seen that movement of the steering bar about the pivot connecting it to the top member 10 will move each of the links 24 and 25 for substantially the same distance and, therefore, flexes each of the runners to the same extent. Therefore, when the sled is steered, each of the runners 15 is flexed in a substantially parallel manner and the sled tracks satisfactorily in taking a curve. In addition, it will be noted that the cross piece 27 connects the forward ends of the runners and, therefore, further insures that these runners will be flexed to substantially the same extent on a turning of the steering bar 23.

In view of the foregoing it will be appreciated that in the practical operation of sleds constructed in accordance with my invention relatively little pressure on the steering handle is required to turn the sled through a given angle and also a relatively large flexing of the runners may be secured with relatively little effort. Consequently, it is possible according to the present invention to provide a sled structure capable of sharper and quicker turns without in any way detracting from efficient operation of the sled.

I claim:

1. In a coasting sled, a rigid deck, a pair of flexible runners carried by said deck, a three-bar linkage having two corners directed forwardly of the sled and having its third corner directed rearwardly thereof, a steering bar having one end hinged to said deck, and a fastening member at each of said three corners interconnecting the bars of said linkage, said fastening elements being immovable relative to the bars for maintaining said bars substantially immovable relative to each other, the fastening element at each of said forwardly directed corners being pivotally connected to the front end of one of said runners and the fastening element at the rearwardly directed corner being pivotally connected to the other end of said steering bar.

2. In a coasting sled, a rigid deck having a pair of side rails, a pair of flexible runners carried by said deck, a three bar linkage having two corners directed forwardly of the sled and having its third corner directed rearwardly thereof, a steering bar having one end hinged to said deck, a pair of side bars having rear ends hinged to said side rails, and a pin at each of said three corners interconnecting the bars of said linkage, said pins being immovable relative to the bars for maintaining said bars substantially immovable relative to each other, the pin at each of said forwardly directed corners being pivotally connected to the front end of one of said runners and the pin at the rearwardly directed corner being pivotally connected to the other end of said steering bar.

3. In a coasting sled, a rigid deck including a pair of side rails, runner supports attached to said deck, two flexible runners having rear ends rigidly secured to said runner supports and free to flex substantially through their entire length, a three-bar linkage having two corners directed forwardly of the sled and having its third corner directed rearwardly thereof, a pair of side bars having rear ends hinged to said side rails and front ends connected to the front ends of said runners, a steering bar having one end hinged to said deck, and a pin at each of said three corners interconnecting the bars of said linkage, said pins being immovable relative to the bars for maintaining said bars substantially immovable relative to each other, the pins at each of said forwardly directed corners being pivotally connected to the front end of one of said runners and the pin at the rearwardly directed corner being pivotally connected to the other end of said steering bar.

4. In a coasting sled, a rigid deck including a pair of side rails, runner supports attached to said deck, two flexible runners having rear ends rigidly secured to said runner supports and free to flex substantially through their entire length, a three-bar linkage having two corners directed forwardly of the sled and having its third corner directed rearwardly thereof, a pair of side bars having rear ends hinged to said side rails and front ends connected to the front ends of said runners, a steering bar having one end hinged to said deck, and a pin at each of said three corners interconnecting the bars of said linkage, said pins being immovable relative to the bars for maintaining said bars substantially immovable relative to each other, the pins at each of said forwardly directed corners being pivotally connected to the front end of one of said runners and the pin at the rearwardly directed corner being pivotally connected to the other end of said steering bar, the pivot point between said steering bar and said linkage being located substantially halfway between the hinge point of the steering bar on the deck and the front ends of said flexible runners.

5. In a coasting sled, a rigid deck including a pair of side rails, runner supports attached to said deck, two flexible runners having rear ends rigidly secured to said runner supports and free to flex substantially through their entire length, a three-bar linkage having two corners directed forwardly of the sled and having its third corner directed rearwardly thereof, a pair of side bars having rear ends hinged to said side rails and front ends connected to the front ends of said runners, a steering bar having one end hinged to said deck, and a pin at each of said three corners interconnecting the bars of said linkage, said pins being immovable relative to the bars for maintaining said bars substantially immovable relative to each other, the pins at each of said forwardly directed corners being pivotally connected to the front end of one of said runners and the pin at the rearwardly directed corner being pivotally connected to the other end of said steering bar, and a handle bar extending transversely of said steering bar and rigidly secured thereto closely adjacent said three-bar linkage.

MAX A. HOLBROOK.